(No Model.)
M. MANNESMANN.
FLEXIBLE COUPLING FOR SHAFTING.
No. 545,085.  Patented Aug. 27, 1895.
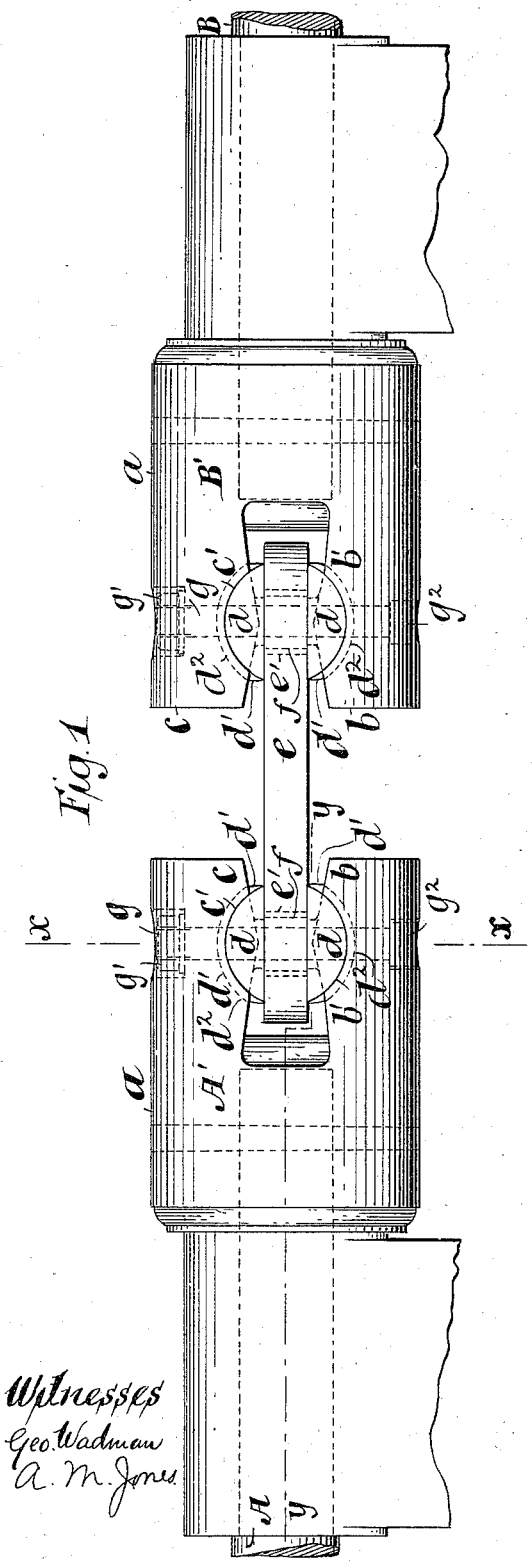
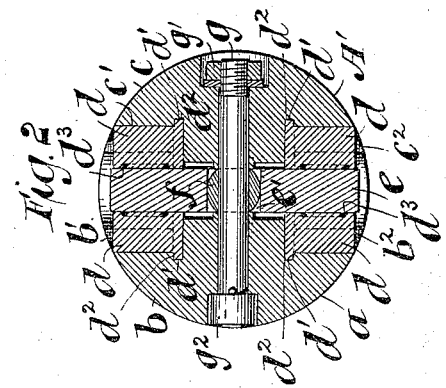
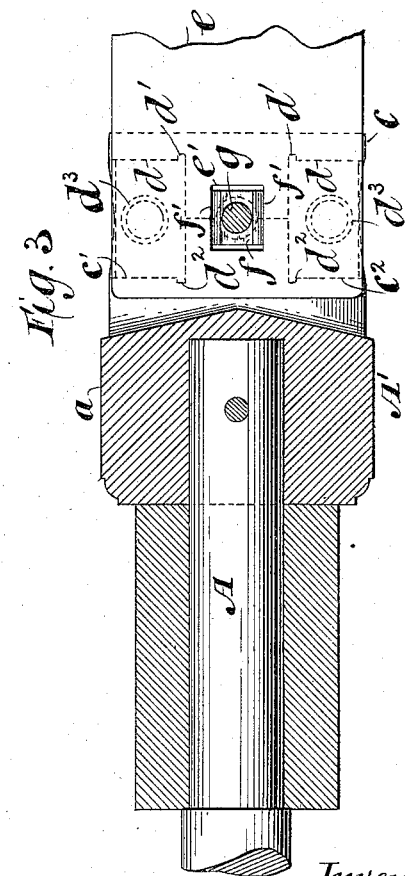
Witnesses
Geo. Wadman
A. M. Jones
Inventor
Max Mannesmann
Per Edw. E. Quimby
Atty.

UNITED STATES PATENT OFFICE.

MAX MANNESMANN, OF REMSCHEID, GERMANY.

FLEXIBLE COUPLING FOR SHAFTING.

SPECIFICATION forming part of Letters Patent No. 545,085, dated August 27, 1895.

Application filed June 12, 1894. Serial No. 514,284. (No model.)

*To all whom it may concern:*

Be it known that I, MAX MANNESMANN, of Remscheid, Germany, have invented certain Improvements in Flexible Couplings for Shafting, of which the following is a specification.

The object of the present invention is to provide for the easy transmission of power from one length of shafting or other rotating object to another length of shafting or rotating object, when, either by prearrangement or by accident, the rotating objects or lengths of shafting which are to be coupled or their bearings are out of alignment with one another.

The invention consists in providing each of the adjacent ends of the lengths of shafting which are to be coupled with substantial jaws, in the opposed faces of which there are formed four recesses having round bottoms concentric with an axis which is transverse with relation to the axis of rotation of the length of shafting to which the jaws are attached. Each of these recesses extends inward a prescribed distance from the outer edge of the jaw and is provided with a concentric groove. In each of these recesses is seated a segment of a cylinder provided upon its curved surface with a flange adapted to be seated in the groove referred to. The opposed flat faces of the pairs of segments of cylinders present lateral bearings for a flat metallic blade which constitutes the link for transmitting motion from one pair of jaws to the other, and which is of sufficient area in cross-section to give it the same torsional strength as that of the shafting in connection with which it is employed. To retain each end of the connecting-blade in its position between the opposed faces of the segments of cylinders, it is provided midway between its sides with a slot which is elongated in the direction of the length of the blade and in which is deposited a transversely-perforated sliding box rounded upon its opposite sides. A pin inserted through transverse perforations in the jaws and through said box serves as a locking-pin to retain the blade between the opposed faces of the segments of cylinders while the blade retains the segments of cylinders in their seats. The blade has a small range of sliding endwise movement between the faces of the segments of cylinders and can rock sidewise by turning the segments of cylinders in their concentric seats. It can also rock edgewise upon the axis afforded by the locking-pin. By this construction the movable members of the coupling readily yield and adjust themselves to variations in the alignment of the lengths of shafting which are coupled, whether such variations are the result of prearrangement or whether they occur by reason of strains affecting the relative positions or alignment of the bearings in which the lengths of shafting turn.

The improvement is particularly valuable for use in connection with propeller shafting on vessels where the different propeller shaft-bearings are exposed to be thrown out of alignment with each other by strains to which the hull of the vessel may be subjected in a heavy sea.

The accompanying drawings of a shaft-coupling embodying the invention are as follows:

Figure 1 is an elevation showing the openings between the jaws and affording an edge view of the coupling-blade and end views of four of the segments of cylinders, which afford the lateral bearings for the coupling-blade. Fig. 2 is a transverse section taken through the plane indicated by the dotted line $x\,x$ on Fig. 1. Fig. 3 is a section taken through the plane indicated by the dotted line $y\,y$ on Fig. 1, affording a view in elevation of the side of a portion of the coupling-blade, and showing the slot for receiving the perforated box through which the locking-pin extends, and also showing in longitudinal section the hub of the jaws and the adjacent portion of the length of shafting to which the hub is attached.

The drawings represent the adjacent portions of two lengths of shafting A and B, provided, respectively, with the bifurcated heads A' B'. As these heads are alike in construction, it will be understood that the description of one will answer for the description of the other. Each of these heads is composed of a cylindrically-recessed hub $a$, adapted to receive the end portion of the adjacent length of shafting to which it is keyed, pinned, or otherwise secured. The opposed faces of the jaws $b$ and $c$ are provided with four round-bottomed recesses $b'\ b^2\ c'\ c^2$. In these recesses are deposited four segments of cylinders $d\ d\ d\ d$, each of which is provided on its curved surface with a flange $d'$, adapted to be engaged in a groove $d^2$ in the bottom of the recess in which the segment is seated. The flat faces of the segments are each provided with a groove $d^3$ for containing a lubricant. The end portions of a flat blade $e$ are seated with a loose sliding fit between the opposed faces of the pairs of segments. Near each end the blade $e$ is provided with an elongated slot $e'$, in which is seated a sliding box $f$, the middle lines of the rounded sides $f'\ f'$ of which bear upon the opposite longer sides of the slot $e'$. The sliding box $f$ is transversely perforated to admit of the passage through it of the locking-pin $g$, which is inserted through transverse perforations in the jaws $b$ and $c$, and is secured in position by the nut $g'$, applied to the screw-threaded end of the pin opposite the end provided with the head $g^2$. The blade $e$ can rock edgewise, carrying with it the sliding box $f$ upon the axis which the pin $g$ affords. The blade $e$ may also rock sidewise upon the geometrical axis of the pairs of segments $d$. When the blade having rocked sidewise is out of alignment with the shafting, it is permitted to also rock edgewise because of the rounding of the sides $f'\ f'$ of the sliding box $f$. This organization therefore constitutes a universal joint, by means of which each end of the blade $e$ is given within a small range the capacity of rocking motion in any direction. In order to afford clearance for the sides of the blade $e$, during its sidewise rocking motions, the opposed faces of the jaws $b\ c$ diverge each way from the lines of intersection with them of the transverse plane $x\ x$, as illustrated in Fig. 1.

As the described device may obviously be employed for coupling many kinds of rotating objects for the purpose of transmitting motion from one to another, and is hence applicable—for instance, for connecting adjacent systems of rolls in a rolling-mill or for connecting the axle of a dynamo with the axle of its motor—it is to be understood that the expression "length of shafting" is herein used in a broad sense, and that the invention is not limited to connecting adjacent lengths of line-shafting, but is present when the described device is used for coupling any rotating objects.

What is claimed as the invention is—

1. The combination in a shaft coupling of the bifurcated heads $A'\ B'$; there being round bottomed and grooved recesses, $b'\ b^2\ c'\ c^2$, in the opposed faces of the jaws, $b$ and $c$, of each of said bifurcated heads; corresponding flanged segments of cylinders seated in said grooved recesses; the blade, $e$, the end portions of which are seated with a sliding fit between the opposed flat faces of the said segments of cylinders and are provided with the slots, $e'\ e'$, the transversely perforated sliding boxes, $f\ f$, and the locking pins, $g\ g$, respectively inserted through said sliding boxes and through the jaws of the said bifurcated heads.

2. A flexible shaft coupling composed of two bifurcated heads affixed respectively to the adjacent ends of the lengths of shafting to be coupled, a flat blade for transmitting rotatory motion from one of said bifurcated heads to the other, rotatable pairs of segments of cylinders seated in the opposed faces of the jaws of each of said bifurcated heads with their flat sides bearing with a loose sliding fit upon the sides of the said blade, a slot extending through each of the parts of said blade which are contained between the jaws of said bifurcated heads, a transversely perforated sliding box contained in each of said slots, and a locking-pin for each head extending through said sliding box and through transverse perforations in the jaws of the head.

MAX MANNESMANN.

Witnesses:
ADOLF NOWAK,
RICHARD LUDWIG, Jr.